Sept. 16, 1969 J. F. WHY ET AL 3,467,788

TONE RINGER

Filed July 20, 1966 3 Sheets-Sheet 1

Sept. 16, 1969 J. F. WHY ET AL 3,467,788

TONE RINGER

Filed July 20, 1966 3 Sheets-Sheet 2

United States Patent Office
3,467,788
Patented Sept. 16, 1969

3,467,788
TONE RINGER

John Frederick Why and Athanasios Papadopoulos, London, England, assignors to International Standard Electric Corporation, New York, N.Y., a corporation of Delaware Filed July 20, 1966, Ser. No. 566,624
Claims priority, application Great Britain, July 26, 1965, 31,808/65
Int. Cl. H04m *1/02*
U.S. Cl. 179—84 9 Claims

ABSTRACT OF THE DISCLOSURE

A tone ringer uses an electrical signal fed into a carbon granule telephone transmitter acoustically coupled to a receiver. The entire system is tuned electrically and acoustically, to provide a relatively high frequency resonance at about 1700 c.p.s. The resulting feedback causes the ringers system to emit a tone each time that ringing current is received. A Helmholtz resonator is especially well suited for providing the acoustical resonance.

This invention relates to telephone tone ringers of the type which are energised by low frequency ringing currents and which produce a higher frquency tone signal from an electro-acoustic transducer, to attract the attention of a called telephone subscriber in a more pleasant manner than by a conventional magneto bell operated directly by the ringing currents.

According to the invention there is provided a tone ringer for a telephone subset adapted to be energised by low frequency ringing currents and to produce a higher frequency tone signal, in which the electrical circuit of the tone ringer includes an electro-acoustic or electromechanical transmitter arranged to be fed by said low frequency ringing currents and an electro-acoustic receiver electrically connected to said transmitter, in which said receiver is acoustically or mechanically coupled as the case may be to said transmitter and said receiver is acoustically coupled to a resonant air filled cavity, so that there is regenerative coupling between said transmitter and said receiver, whereby a tone signal is produced by said receiver having a high fundamental frequency at or near its natural resonant frequency, and in which one or both of said receiver and said transmitter is or are additional transducers of the subset speech circuit.

Figures 1, 2, 3:
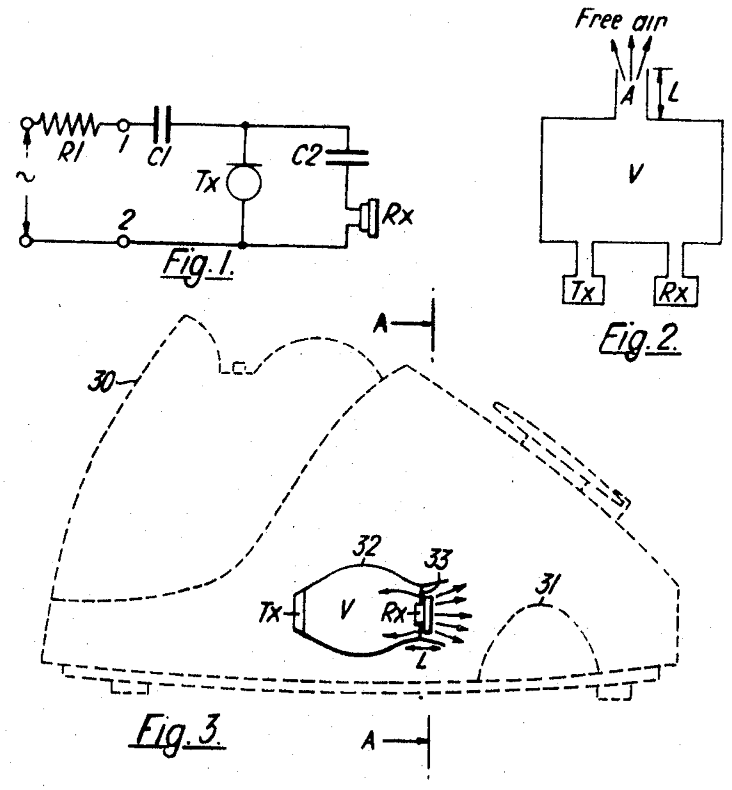
Figure 3A:
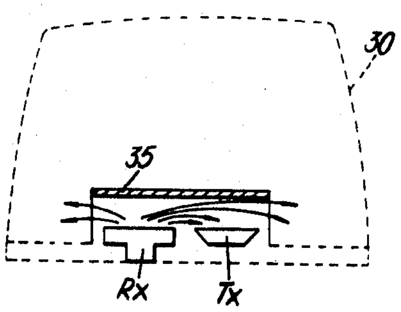
Figure 4:
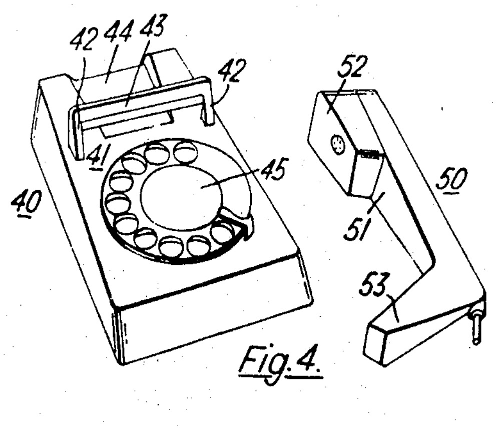
Figure 5:
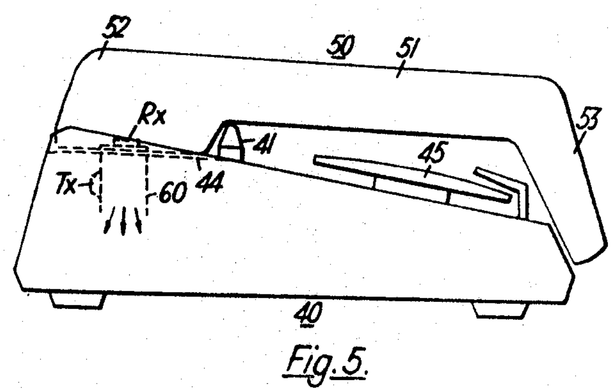
Figure 6:
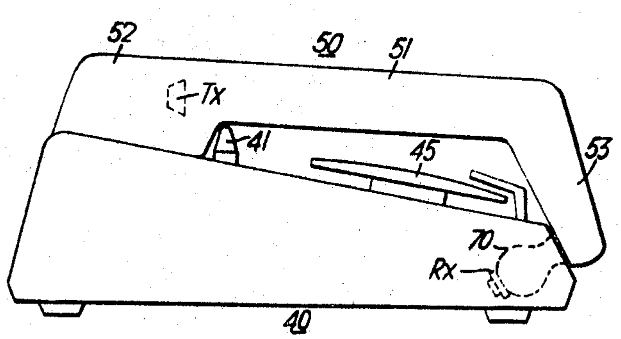
Figure 8:
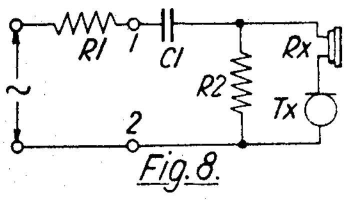
Figure 9:
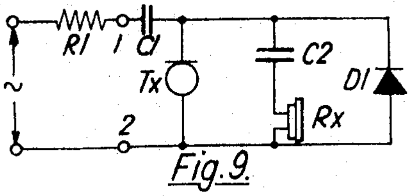
Figure 10:
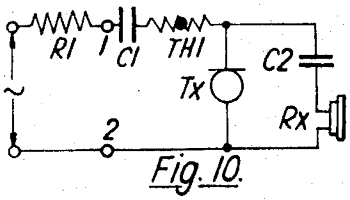
Figure 11:
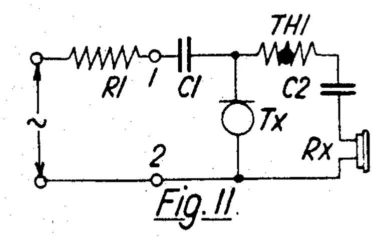
Figure 12:
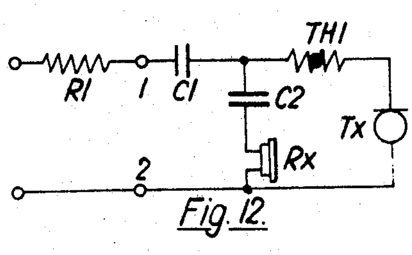

Embodiments of the invention will now be described, by way of example, with reference to the accompanying drawings, in which, FIG. 1 is a circuit diagram showning a preferred method of electrical connection of the components of a telephone tone ringer according to the invention, FIG. 2 is a schematic diagram illustrating the acoustic arrangement of a telephone tone ringer according to the invention, FIG. 3 illustrates the physical realization of a telephone tone ringer and its accommodation within one form of telephone subset, FIG. 3A illustrates the physical realization of a different form of telephone tone ringer and its accommodation within the same form of telephone subset as shown in FIG. 3, viewed in a cross-section of that subset along the line A—A of FIG. 3, FIG. 4 shows another type of telephone subset stand and associated handset, FIG. 5 illustrates the physical realization of a telephone tone ringer, incorporating the handset receiver, and its accommodation within the telephone subset stand and handset shown in FIG. 4, FIG. 6 illustrates the physical realization of a telephone ringer, incorporating the handset transmitter, and its accommodation within the telephone subset stand and handset shown in FIG. 4, FIGS. 7 to 9 show alternative circuit arrangements to that shown in FIG. 1 and, FIGS. 10 to 12 show the incorporation of a thermally sensitive resistor into the circuit arrangement of FIG. 1 to provide a build up of the volume of the acoustic signal.

The telephone tone ringers according to the tinvention may be used in place of the conventional magneto bell and replace the bell sound by a tone having a fundamental frequency in the range of 1200 to 2400 cycles per second, the tone being modulated or warbled at the low frequency of the ringing currents, which is usually 16⅔ cycles per second but may be high as 50 cycles per second. The warbled tone is also interrupted at the usual ringing cadence, which in the United Kingdom consists of "on"—periods of 0.4 second each, separated by "off"—periods which are alternately 0.2 second and 2 seconds in duration.

In FIG. 1 which shows a preferred method of electrical connection of the components of a telephone tone ringer, terminals 1 and 2 are the input terminals of the telephone tone ringer to which is applied the low frequency ringing current. R1 represents the natural line resistance plus feed and exchange relay resistance. This may be increased by an added resistance to swamp line length variations. $C_1$ is the normal telephone DC blocking capacitor normally 1.8 $\mu$F. for current British Post Office telephones. A carbon granules telephone transmitter T*x* is connected to the input terminals 1 and 2 in series with C1. A rocking armature telephone receiver R*x* and a capacitor C2 in series are connected in parallel with the transmitter T*x*. The receiver R*x* is preferably constructed to have a relatively small degree of acoustic damping and to have a natural resonant frequency at approximately 1700 cycles per second. C2 is chosen to supply an adequate signal path for the tone frequency but to effectively block the unwanted low frequency supply current.

In the schematic diagram of FIG. 2, transmitter T*x* and receiver R*x* are acoustically connected to a common main volume V which has a throat entry to free air of effective area A and effective length L, the throat and the main volume together forming a Helmholtz resonator. The purpose of the Helmholtz resonator is to improve the tone and the sound level of the tone ringer and it is tuned substantially to the natural resonant frequency of the receiver R*x* or a frequency harmonically related thereto.

Referring, therefore, to both FIGURES 1 and 2, the acoustic coupling and electrical connection between the transmitter T*x* and the receiver R*x* results in regenerative coupling between the transmitter and the receiver, whereby an acoustic signal is produced by the receiver having a fundamental frequency at or near its resonant frequency. The fundamental frequency of the signal is determined mainly by the mechanical resonance of the receiver diaphragm and moving parts system, but is modified to some extent by the effect of the Helmholtz resonator and to some extent by the frequency response of the transmitter.

The tone, pitch and quality of the note can be varied in a number of ways. One or more acoustic filters may be inserted in the path between the Helmholtz resonator and the transmitter T*x*. Another method of modifying the acoustic feedback to the transmitter is by a length of tube or other suitable channel, which may be spiralled or folded to conserve space. Here the feedback will depend upon the relationship of the fundamental and harmonic wavelengths to the length of the tube. A further method of modifying the feedback is to include an acoustic horn or similar channel, which may also be spiralled or folded. It may be convergent, divergent or a combination of convergent or divergent horns. A further method is to use convergent or divergent sound reflectors or combinations of the same. Similar arrangements may be included in the connection of the receiver R$x$ to the Helmholtz resonator. Furthermore the Helmholtz resonator may include side chambers or resonators in series, parallel, or any combination of the same.

The Helmholtz resonator may be modified by having its throat formed as an acoustic horn. The length L of the throat may also affect the tone since harmonic frequencies which correspond to multiples of quarter wavelengths can either respond or be attenuated. The Helmholtz resonator can be in any form provided there is effectively a main volume and a throat. For example, it could consist of two dished plates which when placed together form a central volume surrounded by an annular throat. Or it could be partially or wholly formed by the base of a telephone and the surface of a table or similar object upon which the telephone rests. Furthermore, it is not essential that a Helmholtz type of resonator be employed. It can be replaced by other air filled resonant cavities, such as an acoustic horn or a tube, into which the transmitter and receiver are inserted at suitable positions to obtain an output signal of desired tone, pitch and quality.

FIG. 3 shows how a tone ringer such as described above can be accommodated in a modern telephone subset such as British Post Office type 706. The subset 30 is shown in outline, as is also one of the apertured domes 31 which are normally inset into the underside of the subset to accommodate the gongs of the conventional magneto bell and provide a sound outlet. The tone ringer occupies the space which would normally be occupied by the conventional magneto bell. The Helmholtz resonator 32 has a volume V and a throat of length L as shown in FIG. 3. The transmitter T$x$ is inset into the back of the resonator 32 and is therefore effectively facing into an aperture in the resonator proper. The receiver R$x$ is held in the throat of the resonator by point supports 33 and faces out of the resonator. The resonator itself thus acts as a filter in the feedback path from the receiver to the transmitter, so that an additional filter may not be needed. FIG. 3 shows only the internal shape of the Helmholtz resonator 32, which could be a split moulding, with the transmitter and receiver simply dropped into position. The necessary electrical connection can be lead through channels in the moulding.

Fig. 3A shows another form of tone ringer accommodated in a British Post Office type 706 telephone subset of the type shown in FIG. 3. The receiver R$x$ and the transmitter T$x$ are mounted side by side on the base of the subset, with their apertures facing up into the body of the subset, and the resonant cavity is formed between the base of the subset and a cover 35 of suitable shape and dimensions, to provide the necessary acoustic coupling. The cover 35 may be of metal, plastics or any other material. Instead of being mounted directly on the base of the subset, the transmitter T$x$ and the receiver R$x$ may be mounted on a printed circuit board on which the rest of the circuit components of the tone ringer can also be mounted.

FIG. 4 shows a telephone subset stand and handset which is described in detail in British patent specification No. 984,552 (M. O. Rowlands 16). The stand 40 is lightweight and basically wedge-shaped. Its detailed features of appearance are the subject of a Registered Design No. 911,592 (M. O. Rowlands 17). A bridge-shaped movable rest 41 consists of two columns 42 linked by a horizontal cross-piece 43. The two columns 42 each pass through a slot in the stand and are associated inside the body of the stand with a gravity switch and held by return spring means so that in the rest position with the handset 50 lifted, the gravity switch is operated. The back-top surface of the stand 40 has a recess 44. The handset 50 consists of a handle portion 51 joining an earpiece 52 and a mouthpiece 53. The handset mouthpiece 53 and the handle portion 51 are hollowed out to form an acoustic horn and the telephone transmitter and receiver are both situated in the earpiece 52. When replaced properly on the stand 40, the handset 50 rests with its length along the length of the stand, over the dial 45. The handset 50 is the subject of a Registered Design No. 906,987 (M. O. Rowlands 13).

FIG. 5 is a side view of the telephone subset shown in FIG. 4 with the handset 50 resting on the stand 40. A tone ringer includes a resonant air cavity 60 having an aperture into the recess 44 at the back of the subset stand 40. The telephone receiver R$x$ is employed in the tone ringer and faces the resonant cavity when the handset 50 rests on the stand 40. An extra telephone transmitter T$x$ faces into the resonant air cavity 60. The tone signal partly emerges into the open air through the small gap between the handset earpiece 52 and the recess 44 at the back of the stand 40; an aperture can also be provided at a convenient position in the underside of the stand. Operation of the gravity switch when the handset 50 is placed on the stand 40 disconnects the telephone receiver R$x$ from the speech circuit of the telephone substation and connects it into the tone ringer electrical circuit as shown in FIG. 1.

FIG. 6 is a side view of the telephone subset shown in FIG. 4 with the handset 50 resting on the stand 40. A tone ringer includes a resonant air cavity 70 having an aperture in the front of the stand 40 opposite the apertures in the mouthpiece 53 when the handset rests on the stand. The telephone transmitter T$x$ is employed in the tone ringer and is located in the telephone earpiece 52 at the other end of the acoustic horn formed in the handset mouthpiece 53 and handle 51. An extra telephone receiver R$x$ faces into the resonant air cavity 70. Operation of the gravity switch when the handset 50 is placed on the stand 40 disconnects the telephone transmitter T$x$ from the speech circuit of the telephone substation and connects it into the tone ringer electrical circuit as shown in FIG. 1.

Although it would be possible to arrange a tone ringer to use both the transmitter and receiver of the speech circuit telephone substation, this is not desirable. One reason is that in the case where both these transducers are in a handset there is the possibility of acoustic shock to the subscriber who depresses the gravity switch while still holding the handset near to his face. An incoming call at this moment might emit a calling tone from the receiver, the face providing sufficient acoustic coupling between the receiver and the transmitter of the handset. In fact it is considered preferable to use two extra transducers. There will then be no need for extra switching by the gravity switch which would to some extent offset the saving in transducers, and also there will be no need for extra apertures in the cover of the subset (as shown in FIGURES 5 and 6) which may become dust traps and spoil the appearance of the subset. However, in the case of subsets such as the one shown in FIGS. 5 and 6 which have not been originally designed to accommodate a magneto bell, there is not room for two extra transducers and so one of the handset transducers must be used in the tone ringer. In this case it is preferably to use an extra receiver (as shown in FIG. 6) because the receiver resonance has to be damped for speech function, which reduces its efficiency for use as a sounder.

In the above description the transmitter and receiver of the tone ringer have been described as a carbon granules type telephone transmitter and a rocking-armature type telephone receiver respectively. The invention is not limited to the use of these particular transducers. The carbon transmitter could be replaced by another electroacoustic transmitter which is fed with electrical power and whose internal impedance is modulated by a variation in pressure, e.g. a strain gauge on a diaphragm. The rocking armature device could be replaced by any other type of electroacoustic transducer which gives satisfactory results in any particular arrangement.

Furthermore, in the above description we have described arrangements in which the receiver R$x$ is acoustically coupled to the transmitter T$x$. Within the scope of the invention, the receiver R$x$ could, alternatively, be mechanically coupled to the transmitter T$x$ by means of a mechanical link between some point of the diaphragm or moving parts system of the electroacoustic receiver and some point of the diaphragm or moving parts system of the electroacoustic transmitter. In fact, in this case of mechanical coupling the transmitter need not be electroacoustic but could be simply an electro-mechanical transducer. The mechanical linkage between the receiver and the transmitter can be designed to have any desired mechanical impedance and can also incorporate mechanical filters to vary the tone pitch and quality of the acoustic output of the tone ringer.

Figure 7:
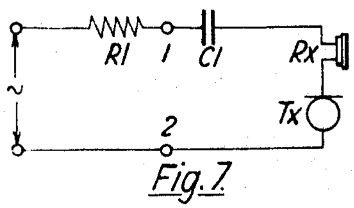

Referring again to the electrical connections of a telephone tone ringer, FIG. 1 shows the preferred circuit arrangement. However, it is possible to have the receiver R$x$ and the transmitter T$x$ in series with the input terminals 1 and 2 as shown in FIG. 7, where the low frequency ringing currents pass through the receiver R$x$. The efficiency of this type of arrangement is improved if a low resistance R2 is inserted across the supply as shown in FIG. 8 to convert the constant current supply through the receiver R$x$ and transmitter T$x$ to a constant voltage supply. A diode D1 or other non-linear device may be included as shown in FIG. 9 to alter the character of the current supply and thus vary the tone of the acoustic output.

In the circuits shown in FIGS. 1 and 9, where the receiver R$x$ and the transmitter T$x$ are in parallel, the feedback into the line of the unwanted higher frequency voltage generated by the transmitter T$x$ may be reduced by adding a high frequency choke in series with the parallel arrangement of the receiver R$x$ and the transmitter T$x$. In the circuits shown in FIGS. 7 and 8 where the receiver R$x$ and the transmitter T$x$ are in series with the line, this feedback may be reduced by incorporating a suitable capacitor in parallel with receiver R$x$ and the transmitter T$x$.

FIGURES 10, 11 and 12 illustrate the incorporation into the tone ringer circuit of a thermally sensitive resistor TH1 which has a negative temperature coefficient of resistance. When power is supplied to the tone ringer, the resistor TH1 takes a certain time for its resistance, and thus the potential difference across it, to attain an asymptotic low value, and thus the volume of the acoustic output of the tone ringer increases from an initially low value to its full volume in this time. The thermal characteristics of the resistor TH1 can be chosen so that its resistance attains its asymptotic low value after at least three repetitions of the cadence of bursts of the conventional low frequency ringing currents applied to the input terminals of the tone ringer, so that the full volume is reached after a period of about 10 seconds or longer. This feature of acoustic build-up may find use in circumstances where the full volume of the audible calling signal may be rather greater than necessary to attract the attention of a telephone subscriber, who may be in close proximity to his set, or extension set, and at the same time sufficiently great to be a nuisance to other persons in the neighbourhood. In FIG. 10 the resistor TH1 is shown in series with both the transmitter T$x$ and receiver R$x$, in FIG. 11 it is in series with only the receiver R$x$ and in FIG. 12 it is in series with only the transmitter T$x$. In all circuits a variable resistance may be incorporated to give manual control of the output volume by the subscriber.

It is to be understood that the foregoing description of specific examples of this invention is made by way of example only and is not to be considered as a limitation on its scope.

We claim:

1. An acoustical signalling system for signalling called telephones, said telephone including transmitters and receivers, said system energized by low frequency ringing currents, means for applying said low frequency ringing current to the transmitter of said called telephone, tuned means for acoustically coupling the transmitter to the receiver of said called telephone, said acoustic coupling means including means for converting said low frequency signal to high frequency acoustic signals approximately at the resonant frequency of said receiver.

2. The acoustical signalling system of claim 1 wherein said coupling means comprises resonant cavity means.

3. The acoustical signalling system of claim 1 wherein said coupling means comprises Helmholtz resonator means.

4. The system of claim 3 including hook switch means for disconnecting the receiver from the speech circuit and connecting it to a signalling circuit, said signalling circuit comprising a pair of input terminals for receiving said low frequency ringing signals, first capacitor means in series with one of said terminals for blocking any D.C. signals, means for connecting said transmitter from said first capacitor means to the second of said pair of terminals, a series circuit comprising a second capacitor means, and said receiver means, and means for bridging said transmitter with said series circuit.

5. The system of claim 4 wherein said receiver is a rocking armature type receiver.

6. The system of claim 4 wherein said signalling circuit comprises a series circuit including said first capacitor, said receiver and said transmitter connected between said pair of terminals.

7. The system of claim 6 wherein resistor means bridges said receiver and transmitter.

8. The system of claim 5 including non-linear resistance means for automatically controlling the volume of said ringing signal received through said receiver.

9. The system of claim 8 and point supports for holding said receiver face out, in said Helmholtz resonator.

References Cited

UNITED STATES PATENTS

| | | | |
|---|---|---|---|
| 1,495,295 | 5/1924 | Fletcher | 179—84 XR |
| 3,075,048 | 1/1963 | Boeryd | 179—84 |
| 2,663,782 | 12/1953 | Insley et al. | 201—83 |
| 2,589,800 | 3/1952 | Goodale et al. | 179—87 |

KATHLEEN H. CLAFFY, Primary Examiner

W. A. HELVESTINE, Assistant Examiner

U.S. Cl. X.R.

179—103, 1